US006573689B1

(12) United States Patent
Renehan

(10) Patent No.: US 6,573,689 B1
(45) Date of Patent: Jun. 3, 2003

(54) PROGRAMMABLE ALTERNATOR REGULATION CIRCUITRY

(75) Inventor: John F. Renehan, South Lyon, MI (US)

(73) Assignee: International Rectifier Corporation, El Segundo, CA (US)

( * ) Notice: Subject to any disclaimer, the term of this patent is extended or adjusted under 35 U.S.C. 154(b) by 40 days.

(21) Appl. No.: 09/966,596

(22) Filed: Sep. 28, 2001

(51) Int. Cl.[7] .............................................. H02P 9/00
(52) U.S. Cl. ............................ 322/24; 322/28; 322/27
(58) Field of Search ............................ 322/20, 22, 23, 322/24, 25, 27, 28, 45

(56) References Cited

U.S. PATENT DOCUMENTS

| 4,314,193 | A |   | 2/1982  | Mortonson ................. 322/28  |
|-----------|---|---|---------|------------------------------------|
| 4,315,204 | A |   | 2/1982  | Sievers et al. ............... 322/28 |
| 4,386,310 | A |   | 5/1983  | Sievers ...................... 322/28 |
| 4,446,417 | A |   | 5/1984  | Fox et al. ................... 322/25 |
| 4,595,965 | A | * | 6/1986  | Glennon ..................... 361/20 |
| 4,733,159 | A |   | 3/1988  | Edwards et al. ........... 323/282 |
| 4,839,575 | A |   | 6/1989  | MacFarlane ............... 322/25 |
| 4,882,531 | A |   | 11/1989 | Edwards et al. ............ 322/60 |
| 4,918,592 | A |   | 4/1990  | Shimizu .................... 363/50 |
| 5,013,995 | A |   | 5/1991  | Rashid ...................... 322/25 |
| 5,021,727 | A | * | 6/1991  | Mashino ...................... 322/7 |
| 5,038,094 | A |   | 8/1991  | Rashid ...................... 322/28 |
| 5,153,498 | A | * | 10/1992 | Parro ........................ 322/25 |
| 5,173,654 | A |   | 12/1992 | Boella et al. ............... 322/25 |
| 5,210,480 | A |   | 5/1993  | Iwatani et al. .............. 322/28 |
| 5,225,764 | A |   | 7/1993  | Falater ...................... 322/28 |
| 5,254,935 | A |   | 10/1993 | Vercesi et al. .............. 322/29 |
| 5,285,147 | A |   | 2/1994  | Rashid ...................... 322/28 |
| 5,298,851 | A |   | 3/1994  | DeNardis ................... 322/28 |
| 5,481,176 | A |   | 1/1996  | DeBiasi et al. ............... 322/7 |
| 5,583,420 | A |   | 12/1996 | Rice et al. .................. 322/25 |
| 5,644,213 | A |   | 7/1997  | Renehan .................... 322/28 |
| 5,907,233 | A |   | 5/1999  | Jabaji ....................... 322/28 |
| 5,929,612 | A | * | 7/1999  | Eisenhaure et al. ......... 322/47 |
| 6,064,186 | A |   | 5/2000  | Pierret et al. ............... 322/28 |
| 6,184,661 | B1|   | 2/2001  | Becker et al. .............. 322/25 |
| 6,188,203 | B1|   | 2/2001  | Rice et al. .................. 322/25 |
| 6,194,877 | B1|   | 2/2001  | Judge et al. ................ 322/28 |
| 6,215,277 | B1|   | 4/2001  | Renehan ................... 322/117 |

* cited by examiner

*Primary Examiner*—Nicholas Ponomarenko
(74) *Attorney, Agent, or Firm*—Ostrolenik, Faber, Gerb & Soffen, LLP

(57) ABSTRACT

Among the embodiments of the present invention is an apparatus that includes an alternator and circuitry operable to regulate electrical power output by the alternator. This circuitry includes an analog-to-digital converter with an analog signal input node. The converter is responsive to three or more different analog signal levels provided to this input node to correspondingly generate three or more different multibit control word values. The circuitry is programmable with any of these values to correspondingly operate in three or more different operating configurations depending on the value selection.

30 Claims, 4 Drawing Sheets

PROGRAMMABLE ALTERNATOR REGULATION CIRCUITRY

BACKGROUND

The present invention relates to electrical circuitry, and more particularly, but not exclusively, relates to circuitry to regulate operation of an alternator.

The ongoing, desire to provide more flexible circuitry with fewer components has led to the provision of programmable circuit features for many applications. Of particular interest, is the ability to program various features of circuits used in the regulation of electrical power generators, such as vehicle alternators. Unfortunately, the potentially harsh environment to which such circuitry can be exposed sometimes poses problems. For example, this harsh environment can adversely impact the reliability of "flash" memory or Electrically Erasable Programmable Read Only Memory (EEPROM) sometimes used for nonvolatile storage of programming information. Some types of "write once" Programmable Read Only Memory (PROM) withstand harsh environments better; however, unlike EEPROM or flash memory, this type of device does not readily facilitate reprogramming, which is often desired. These memory-based approaches can also be difficult to properly test.

Thus, a need remains for further advancements in this area of technology. The present invention meets this need.

SUMMARY

One embodiment of the present invention includes unique electrical circuitry. Other embodiments include unique integrated circuits, apparatus, and methods for regulating an electrical power generation device.

In a further embodiment of the present invention, circuitry is programmed with an analog input. This analog input can be used to select among three or more different multibit values.

Still a further embodiment includes an integrated circuit and an analog programming device mounted on a common substrate. The analog programming device includes at least one resistance device that can be adjusted to change programming of the integrated circuit. In one form, the resistance device includes a thick film resistor that can be trimmed to provide the desired adjustment.

Another embodiment of the present invention includes: providing circuitry operable to regulate an alternator in accordance with any of three or more different multibit control word values; selecting one of these values; and programming the circuitry with the selected value by providing an analog input to an analog-to-digital converter included in the circuitry. This converter can be responsive to three or more different levels of the analog input to correspondingly generate the three or more multibit control word values.

Yet another embodiment of the present invention includes an integrated circuit having an analog-to-digital converter with an analog signal input. This converter is responsive to three or more different analog signal levels provided to the input to correspondingly generate three or more different values for a multibit control word. An analog programming device is electrically coupled to the integrated circuit to provide an analog signal to the input for selection of one of the possible values. The multibit control word can be used to program the integrated circuit.

For a further embodiment of the present invention, an integrated circuit is operable to regulate electrical power output by an alternator that is responsive to different values of a multibit control word. This circuit includes three or more comparators each defining a different bit of the multibit control word. An analog programming device is electrically coupled to the circuit to input the same analog signal to each of the comparators. This device is operable to select one of the different values of the multibit control word.

Yet a further embodiment comprises: providing an integrated circuit that includes an analog input, supplying an analog signal to the analog input to select among three or more different values of a multibit control word to program the integrated circuit; and regulating an alternator with the integrated circuit.

One object of the present invention is to provide unique electrical circuitry.

Another object of the present invention is to provide a unique integrated circuit, apparatus, or method for regulating an electrical power generation device.

Further objects, embodiments, forms, advantages, benefits, and aspects of the present invention shall become apparent from the detailed description and drawings provided herewith.

DETAILED DESCRIPTION

Figure 1:
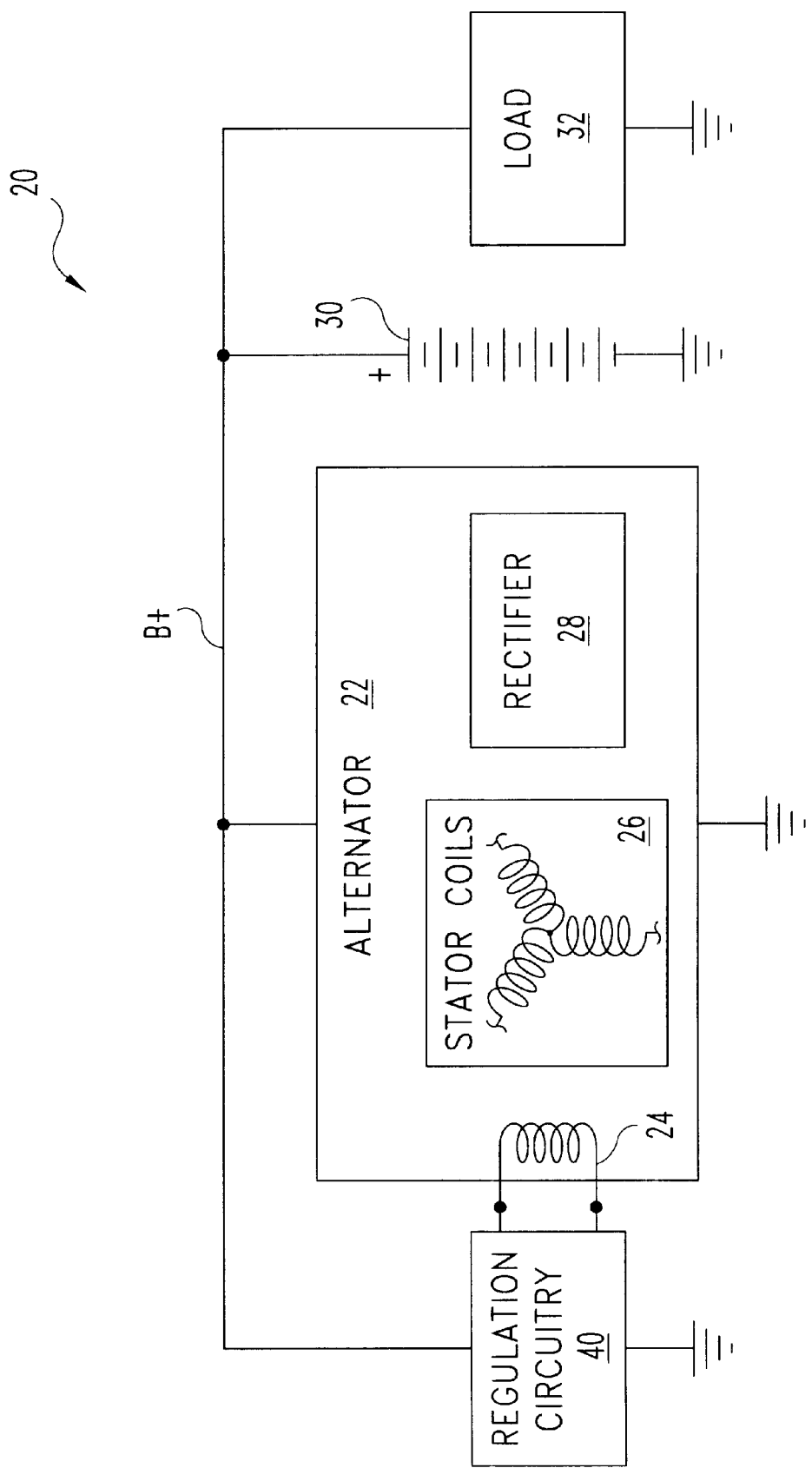
FIG. 1 is a schematic view of an electrical system of one embodiment of the present invention.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 schematically illustrates electrical system 20 of one embodiment of the present invention. System 20 includes alternator 22. Alternator 22 is of a standard type that includes a field winding or coil 24 mounted to a rotatable shaft and a number of stator coils 26. Typically, stator coils 26 are arranged to generate a three-phase electrical output when the shaft is rotated and electrical current is flowing through field coil 24. Rectifier 28 is also provided that converts the Alternating Current (AC) output of the stator coils 26 to a Direct Current (DC) output. This DC output is used to selectively provide electrical current to field coil 24 as will be more fully explained hereinafter.

Electrical power from alternator 22 is output on DC voltage bus B+ of electrical system 20. System 20 further includes electrical energy storage battery 30, electrical load 32, and regulation circuitry 40 that are also electrically coupled to bus B+. Circuitry 40 regulates the electrical output of alternator 22 on bus B+. Collectively, system 20 can be of a type that is carried by a vehicle such as an automobile or truck where rotational mechanical power is provided to the shaft of alternator 22 by the vehicle engine (not shown). For this arrangement, battery 30 can be comprised of a number of electrochemical cells that are recharged by alternator 22 via bus B+, and/or load 32 can be one or more subsystems or devices associated with the vehicle. In other embodiments, system 20 can be of a non-vehicle variety, can include a different type of electrical power generator instead of alternator 22, battery 30 may be differently arranged or may be absent, and/or load 32 may be differently arranged or may be absent.

Figure 2:
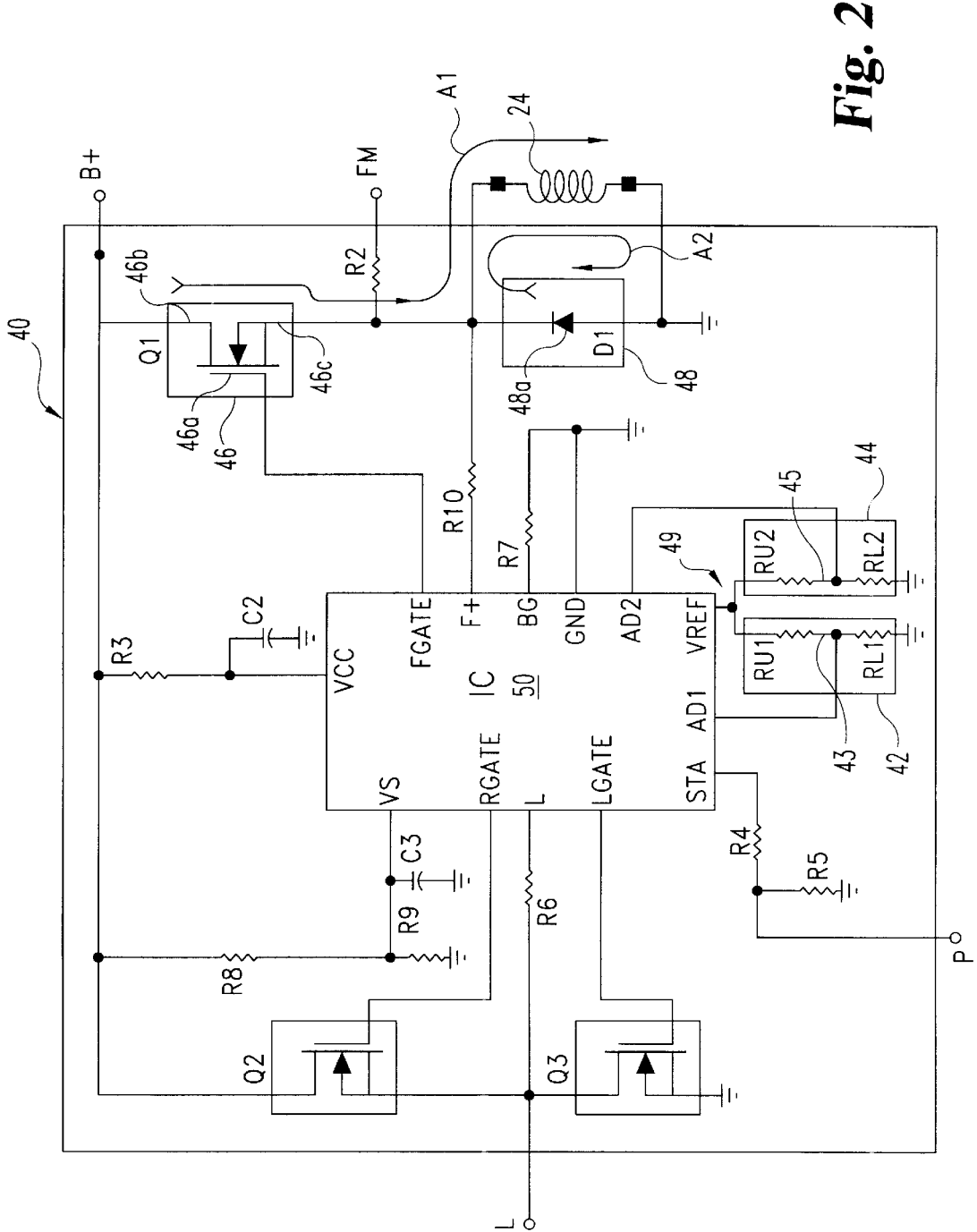
FIG. 2 is a schematic view illustrating the circuitry of FIG. 1 in greater detail.

Referring additionally to FIG. 2, circuitry 40 includes Integrated Circuit (IC) 50. Generally, IC 50 senses voltage provided by alternator 22 from bus B+. The sensed voltage is input to terminal VS of IC 50 through the voltage divider/filter provided by resistors R8 and R9 and capacitor C3. This sensed DC voltage input to IC 50 is internally compared to a reference voltage to determine if the voltage on bus B+is at a desired setpoint. To maintain this desired setpoint voltage level, IC 50 modulates current flow through field coil 24 of alternator 22 by selectively controlling excitation current supplied to field coil 24 with an active switching device 46. Device 46 is illustrated in the form of a Field Effect Transistor (FET) Q1 with gate 46a, drain 46b, and source 46c. Drain 46b is coupled to bus B+and source 46c is coupled to field coil 24. Current flows from drain 46b through source 46c to field coil 24 when an activation signal of a suitable level is provided to gate 46a. Terminal FGATE of IC 50 is electrically coupled to gate 46a to output field driver control signal FD to electrically activate/deactivate transistor Q1 and correspondingly start/stop the supply of excitation current to field coil 24 through device 46 per a desired duty cycle.

It should be appreciated that during an active or "on" state of transistor Q1, electrical current flows through field coil 24 and transistor Q1 along the path represented by arrow A1. When IC 50 deactivates or "turns off" transistor Q1 to stop the supply of electrical current to field coil 24 through driver 46, the inductive nature of field coil 24 results in a collapsing magnetic field. During deactivation periods of driver 46, this collapsing magnetic field has the potential to generate undesirable reverse voltage spikes. To reduce this potential, recirculation circuit 48 is electrically coupled across field coil 24, including unidirectional current device 48a in the form of diode D1. The cathode/anode orientation of diode D1 is arranged to be reversed biased (nonconductive) when electrical current flows through transistor Q1 and field coil 24 in the direction indicated by arrow A1, and to be forward biased (conductive) in response to reverse voltage caused by the collapsing magnetic field of field coil 24. Further, diode D1 recirculates induced current through field coil 24 along the path represented by arrow A2 while transistor Q1 is inactive or "off" (nonconductive), tending to average current flow through field coil 24. Terminal F+ of IC 50 is a high-side field coil feedback terminal that can be used to detect the presence of a fault in transistor Q1 and also can be used in various control aspects of integrated circuit 50. It is electrically coupled to the high-side of field coil 24 by resistor R10. Terminal FM connected by resistor R2, provides a way to externally monitor the electrical signal at the electrical node shared by source 46c, field coil 24, and the cathode of diode D1.

Figure 3:
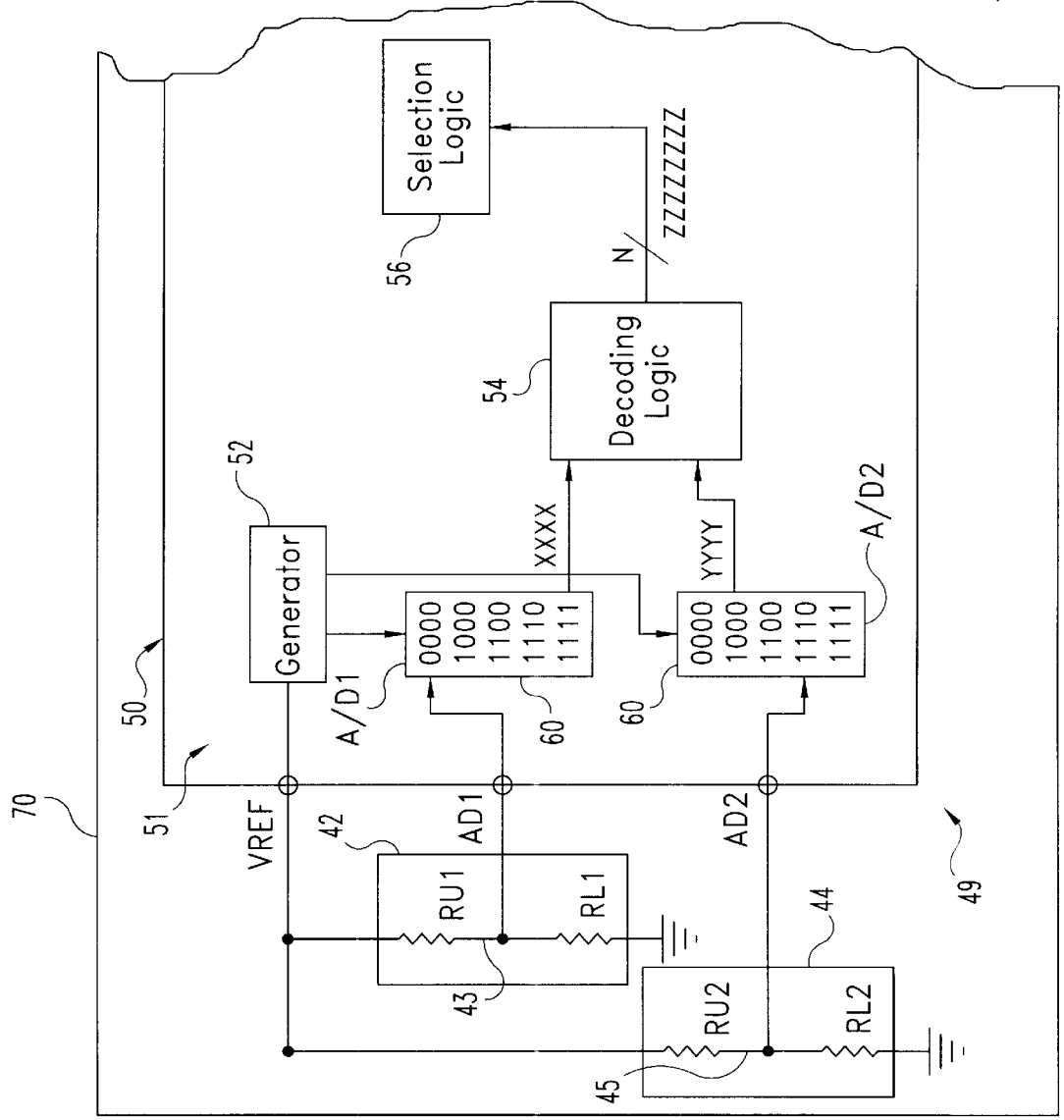
FIGS. 3 and 4 are schematic views illustrating a programming circuit of FIG. 2 in greater detail.

Depending on the specific application of electrical system 20, different regulation strategies and/or regulation parameters may be desired. Circuitry 40 is of a programmable variety to accommodate such differences. Referring to FIGS. 2 and 3, programming circuit 49 is schematically illustrated. Programming circuit 49 includes analog programming devices 42 and 44 electrically coupled to conversion/logic devices 51 internal to IC 50. Devices 51 include voltage reference generator 52 configured to output a reference voltage VR on terminal VREF of IC 50, decoding logic 54, and selection logic 56. Selection logic 56 is utilized to select/configure IC 50 to perform in the manner programmed with circuit 49. Specific examples of such programming will be further described hereinafter, but first further description of programming circuit 49 is provided as follows.

Referring specifically to FIG. 3, devices 51 also include two analog-to-digital converters 60 more specifically designated as converter A/D1 and converter A/D2. Converter A/D1 receives an analog input signal through terminal AD1 of IC 50 from analog programming device 42, and converter A/D2 receives an analog input signal through terminal AD2 of IC 50 from analog programming device 44. Converters A/D1 and A/D2 digitize each respective analog input signal to one of the following four-bit binary values: 0000, 1000, 1100, 1110, or 1111. This digitized output is represented as four-bit control word XXXX for converter A/DI and four-bit control word YYYY for converter A/D2.

Figure 4:
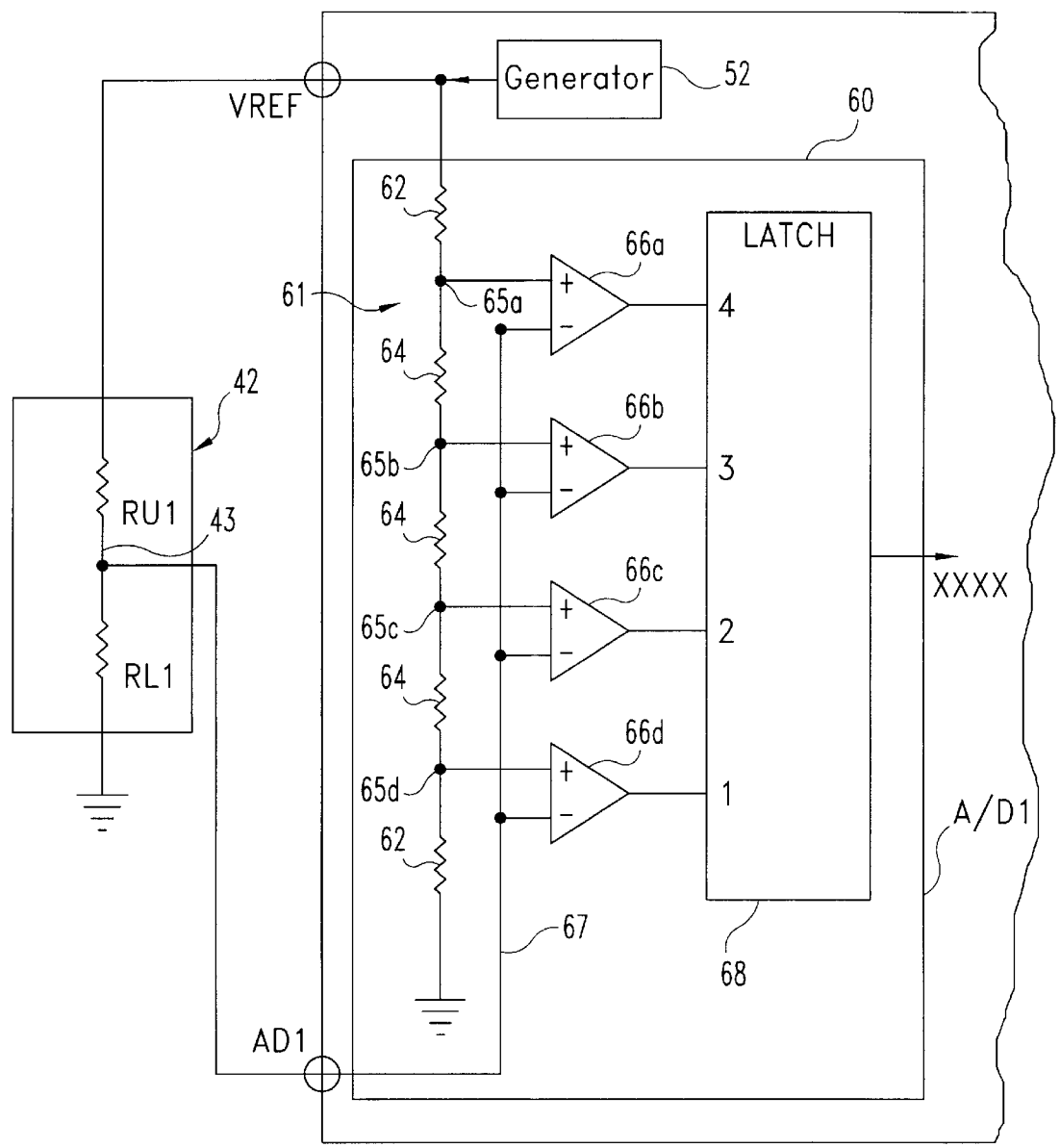

As specifically illustrated for the converter A/D1 example in FIG. 4, each analog-to-digital converter 60 includes resistor series network 61 coupled between voltage reference generator 52 and ground. Resistor series network 61 includes two resistors 62 at each end and three serially coupled resistors 64 between the two resistors 62. Each analog-to-digital converter 60 also includes four analog comparators 66a, 66b, 66c, and 66d (collectively designated comparators 66). Comparators 66a, 66b, 66c, and 66d each have a corresponding high-impedance, positive input connected to electrical node 65a, 65b, 65c, and 65d; respectively. As a result, resistor series network 61 can be used to define different voltage comparison thresholds for each of comparators 66. For the depicted embodiment, resistors 62 each have a resistance of approximately half the resistance of each of resistors 64, so that relative to the voltage output VR from voltage reference generator 52, the voltages at nodes 65a, 65b, 65c, and 65d are about ⅞*VR, ⅝*VR, ⅜*VR, and ⅛*VR; respectively. For other embodiments, a different resistor network and/or threshold level arrangement can be utilized as would occur to those skilled in the art.

Comparators 66 also each have a corresponding high-impedance, negative input. For each converter 60, the negative inputs of comparators 66 are coupled together at a common electrical analog signal input node 67. Accordingly, the same signal can be input to each of converters 60 for comparison to the different thresholds defined with resistor series network 61. Converters 60 each further include a four-bit latch 68 coupled to receive the outputs of comparators 66.

For FIG. 4, converter A/D1 is specifically shown with analog programming device 42. Device 42 is electrically coupled to voltage reference generator 52 via terminal VREF of IC 50 and electrical ground. Device 42 includes voltage divider 43 formed by two resistors RU1 and RL1. Resistors RU1 and RL1 are electrically coupled together at node 67 in common with terminal AD1 and the negative inputs of comparators 66 for converter A/D1. The voltage input VIN1, generated by voltage divider 43 varies with the resistance values of RU1 and RL1 according to the relationship: VIN1=(VR*RL1)/(RU1+RL1). Correspondingly, VIN1 can have a range of from about zero to about VR volts from voltage reference generator 52 (VIN1 is equal to about zero when RU1 is "open" (high impedance) and VIN1 is equal to about VR when RL1 is "open" (high impedance)).

Converter A/D2 is configured in the same manner as detailed in FIG. 4 for converter A/D1. Further, as illustrated in FIGS. 2 and 3, terminal AD2 of converter A/D2 is coupled to analog programming device 44. Analog programming device 44 is electrically coupled between terminal VREF and ground in the same manner as analog programming device 42, and includes voltage divider 45 comprised of resistors RU2 and RL2. Voltage divider 45 operates to provide an input analog voltage signal VIN2 to converter A/D2 according to the relationship: VIN2=(VR*RL2)/(RU2+RL2).

Either analog programming device 42 or 44 can be arranged to provide an analog input signal that is below the comparison threshold of all the comparators 66 of the corresponding converter 60 (<⅛*VR). Accordingly, for input voltage VIN1 or VIN2<⅛*VR, the respective output of comparators 66 is 0000. Alternatively, either of devices 42 or 44 can be arranged to provide an input voltage to converter 60 that is: (a) between ⅛*VR and ⅜*VR to cause only comparator 66d to change state; (b) between ⅜*VR and ⅝*VR to cause only comparators 66c and 66d to change state; (c) between ⅝*VR and ⅞*VR to cause only comparators 66b, 66c, and 66d to change state; or (d) greater than ⅞*VR to cause all of comparators 66 to change state. For conditions (a), (b), (c), and (d) listed above; the resulting output states of comparators 66 correspond to the four-bit binary values 1000, 1100, 1110, and 1111; respectively. Latch 68 is triggered to maintain these states to provide control word XXXX or YYYY, as appropriate. In one embodiment, control words XXXX and YYYY are only latched upon power-up or reset of IC 50. In other embodiments, a different latching timing could be used to change control words XXXX or YYYY.

Each of the multibit control words XXXX and YYYY from converters A/D1 and A/D2 have the potential to represent five (5) different unique values, and therefore collectively have the potential to represent twenty-five (25) different unique values. Decoding logic 54 receives control words XXXX and YYYY as inputs to generate a corresponding eight-bit control word represented as ZZZZZZZZ in FIG. 3. Decoding logic 54 is operable to assign a value to control word ZZZZZZZZ that varies in accordance with the different possible combinations of control words XXXX and YYYY. Accordingly, control word ZZZZZZZZ can have up to twenty-five (25) different values.

Selection logic 56 receives control word ZZZZZZZZ to select corresponding circuits and/or parameters of IC 50. Logic variable table I below represents various programming options potentially available for one embodiment of IC 50. In table I, B0, B1, B2, B3, B4, and B5 represent bits that have the potential to vary with control word ZZZZZZZZ:

TABLE I

| Function | B0 | B1 | B2 | B3 | B4 | B5 |
|---|---|---|---|---|---|---|
| RW1: Voltage Regulation | Temperature Compensation slope | Temperature Compensation slope | | | | |
| RW2: Stator Frequency | Initiate regulation fre- | Initiate regulation frequency threshold | Terminate regulation frequency threshold | Terminate regulation frequency threshold | Self-excitation fre- | Self-excitation fre- |

TABLE I-continued

| Function | B0 | B1 | B2 | B3 | B4 | B5 |
|---|---|---|---|---|---|---|
| Thresholds | quency | | | | quency threshold | quency threshold |
| RW3: Stator Voltage Thresholds | Initiate regulation voltage | Initiate regulation voltage threshold | Terminate regulation voltage threshold | Terminate regulation voltage threshold | Self-excitation frequency threshold | Self-excitation voltage threshold |
| RW4: Field Current Ramp Rate | Field current ramp rate | Field current ramp rate | Field current ramp rate disable frequency | Field current ramp rate disable frequency | | |
| RW5: Undervoltage Fault | Fault Indicated? Y/N | Undervoltage threshold | Undervoltage threshold | Undervoltage enable frequency | Undervoltage enable frequency | |
| RW6: Overvoltage Fault | Mode-fixed or setpoint referenced | Fixed mode fault threshold voltage | Fixed mode fault threshold voltage | | | |

Referring back to FIG. 2, to better understand various programmable features, further aspects of IC 50 are first described in terms of its Input/Output (I/O) terminals. Terminals VCC and GND of IC 50 provide standard electrical power supply connections to bus B+ and ground, respectively, via the filter provided by resistor R3 and capacitor C2. Terminal BG is a band gap reference voltage output that can be used in other external functions as appropriate, which is shown in FIG. 2 as being tied to ground via resistor R7. Terminal L of IC 50 is provided for various control functions, and can be configured to activate the module with voltage or current and further to indicate the presence or absence of various faults. Input L is tied to terminal L by resistor R6. Terminal RGATE of IC 50 is connected to the control gate of FET transistor Q2, which can be used as a driver for a relay (not shown). Terminal LGATE of IC 50 is electrically coupled to a gate of FET transistor Q3. Transistor Q3 can be utilized to drive a lamp or other device (not shown) to indicate operational status of alternator 22.

Referring additionally to table I, six rows RW1, RW2, RW3, RW4, RW5, and RW6 are indicated that generally group programming options for Voltage Regulation, Stator Frequency Thresholds, Stator Voltage Thresholds, Field Current Ramp Rate Control, Undervoltage Fault, and Overvoltage Fault; respectively. The first row of table I, RW1, relates to selection of the rate of change of slope for a Temperature Compensation (TC) curve applicable to the setpoint voltage. The first two bits B0 and B1 of row RW1 are utilized select the TC curve. In one nonlimiting example, selection of the TC curve with bits B0 and B1 provides the following options: a zero rate of change (zero millivolts per degrees Celsius (mV/C)) for bit values of 00, −2.5 mV/C for bit values of 01, −5 mV/C for bit values of 10, and −10 mV/C for bit values of 11.

Rows RW2 and RW3 of table 1 relate to stator characteristics as determined through input P shown in FIG. 2. The P input is coupled to the STA terminal of IC 50 via a voltage divider formed by resistors R4 and R5. Terminal STA of IC 50 is a stator phase input that can be utilized to determine rotational speed and output status of alternator 22. Terminal STA can further be used to initiate and terminate operation of IC 50, detect alternator faults, and enable various features. To initiate regulation with IC 50, a sinusoidal voltage signal from the P input is detected that meets a threshold peak magnitude and frequency selectable with programming circuit 49. The regulation initiation threshold frequency is selectable by two bits represented as bits B0 and B1 in row RW2 of table I, and the regulation initiation threshold peak magnitude is selectable by two bits represented as bits B0 and B1 in row RW3 of table I. Regulation by IC 50 is terminated when the P input signal falls below a frequency threshold selectable with two bits represented as bits B2 and B3 in row RW2 of table I and the peak magnitude of the P input signal falls below a threshold selectable with two bits represented as bits B2 and B3 of row RW3.

In one nonlimiting example, the regulation initiation frequency is selected with bits B0 and B1 of row RW2 according to: 60 Hertz (Hz) for bit values of 00, 80 Hz for bit values of 01, 100 Hz for bit values of 10, and 120 Hz for bit values of 11; and the regulation termination frequency is selected with bits B2 and B3 of row RW2 according to: 30 Hertz (Hz) for bit values of 00, 40 Hz for bit values of 01, 50 Hz for bit values of 10, and 60 Hz for bit values of 11. For this example, the regulation initiation voltage is selected with bits B0 and B1 of row RW3 according to: 1.0 Volt for bit values of 00, 1.5 V for bit values of 01, 2.0 V for bit values of 10, and 2.5 V for bit values of 11; and the regulation termination voltage is selected with bits B2 and B3 of row RW3 according to: 0.5 Volt for bit values of 00, 1.0 V for bit values of 01, 1.5 V for bit values of 10, and 2.0 V for bit values of 11.

Bits B4 and B5 of rows RW2 and RW3 correspond to the selection of a self-excitation frequency and voltage threshold, respectively. These self-excitation levels are for activating the module via the stator input P in the absence of an external activation signal. Generally, alternator rotation generates a low voltage signal from residual magnetism in the rotor prior to regulation circuitry activation. This low amplitude signal can be detected with IC 50 and used for self-activation.

In one nonlimiting example, bits B4 and B5 of row RW2 are selected according to: 120 Hz for bit values of 00, 180 Hz for bit values of 01, 240 Hz for bit values of 10, and 300 Hz for bit values of 11 and bits B4 and B5 of row RW3 are selected according to: 0.5 V for bit values of 00, 1.0 V for bit values of 01, 1.5 V for bit values of 10, and 2.0 V for bit values of 11.

Row RW4 of table I is directed to various Field Current Ramp rate control (FCR) options. IC 50 can implement FCR by providing different rates of change of the duty cycle (ramp rate) for signal FD based on frequency. Specifically, in one form, IC 50 provides a to programmable ramp rate when operating below a programmable disable frequency. The FCR programmable ramp rate is selected with two bits represented as bits B0 and B1 of row RW4. The programmable disable frequency is selected with two bits represented as bits B2 and B3 in row RW4. In one nonlimiting example, the specified ramp rate is selected with bits B0 and B1 of row RW4 according to: 200%/s (corresponding to no FCR) for bit values of 00, 40%/s for bit values of 01, 20%/s for bit values of 10, and 10%/s for bit values of 11; and the specified disable frequency is selected with bits B2 and B3 of row RW4 according to: 260 Hertz (Hz) for bit values of 00, 280 Hz for bit values of 01, 300 Hz for bit values of 10, and 320 Hz for bit values of 11.

Row RW5 relates to an optional, bit selected undervoltage fault mode of IC 50. Bit B0 of row RW5 is set to enable this fault mode (B0=1) and not set (B0=0) to disable it. When the undervoltage fault mode is selected, IC 50 generates a fault condition if the voltage on terminal VS falls below a threshold as defined with bits B1 and B2 and an enabling undervoltage stator frequency is present as defined with bits B3 and B4. In one nonlimiting example, the undervoltage threshold is selected with bits B1 and B2 of row RW5 according to: 10.5 V for bit values of 00, 11.0 V for bit values of 01, 11.5 V for bit values of 10, and 12.0 V for bit values of 11; and the undervoltage enabling stator frequency is selected with bits B3 and B4 of row RW5 according to: 260 Hz for bit values of 00, 280 Hz for bit values of 01, 300 Hz for bit values of 10, and 320 Hz for bit values of 11.

Row RW6 relates to overvoltage faults. Overvoltage faults are provided in one of two possible bit-selectable modes as represented by bit B0 in row RW6. In one mode, the overvoltage fault is triggered if the voltage at terminal VS exceeds a fixed amount determined with two bits represented as bits B1 and B2 in row RW6. In the other mode, the overvoltage fault is triggered if the voltage at terminal VS exceeds the setpoint voltage by a predetermined, incremental amount. For one nonlimiting example, if bit B0 of row RW6 is not set, this fixed-predetermined, setpoint-referenced overvoltage mode is active, and if bit B0 is not set, the point mode is active in which case, the threshold voltage is determined with bits B1 and B2 according to: 15.5 V for bit values of 00, 16.0 V for bit values of 01, 16.5 V for bit values of 10, and 17.0 V for bit values of 11.

It should be understood that table I is merely one example of the types of parameters, parameter values, modes, and options that can be programmed with programming circuit 49. In other embodiments, more or fewer parameters, parameter values, modes, options, programming bits, and/or different types of features could be selected for programming. It should be understood that the number of possible combinations that can be defined by the bit variables represented in table I exceed the maximum of twenty-five (25) options that are programmable with circuit 49 as described in connection with FIGS. 3 and 4. Accordingly, only a subset of the possible combinations can be programmed with circuit 49. Other inputs or devices could be used to increase the number of programmable combination options including the addition of one or more analog-to-digital converters and corresponding analog programming devices. In still other embodiments, one or more analog-to-digital converter/analog programming device arrangements could be used in conjunction with other programming techniques including one or more discrete inputs, those utilizing one or more memory devices, and/or such different techniques as would occur to those skilled in the art. Likewise, while four comparators are used to provide a four-bit control word, a different number could be used. Also, the configuration of any decoding logic and any control word output by such logic can vary as would occur to one skilled in the art.

As illustrated in FIG. 3, IC 50 and analog programming devices 42 and 44 are mounted on a common substrate 70. In one form, substrate 70 is composed of a ceramic material. IC 50, devices 42 and 44, and optionally other components of circuitry 40 can be provided in the form of a hybrid circuit module carried on substrate 70, on a standard printed wiring board, or in such different arrangement as would occur to those skilled in the art. For one embodiment, one or more of resistors RU1, RL1, RU2, and/or RL2 are of a thick film variety that can be statically trimmed to program the desired multibit control words XXXX and/or YYYY as part of a mass production manufacturing process. In other embodiments, a different resistor variety and/or different type of analog signal generating device can be utilized in addition to or as an alternative to a discrete component voltage divider, including, but not limited to a voltage reference provided by one or more zener diodes, an adjustable resistance device such as a rheostat or potentiometer, and/or such other component(s)/circuitry as would occur to one skilled in the art.

Alternatively or additionally, the circuits provided by IC 50 can differ among various embodiments of the present invention. In one embodiment, IC 50 is provided in the form of an Application Specific Integrated Circuit (ASIC), providing further flexibility to desired changes. For such an embodiment, one or more interchangeable IC masks could be used to select options not provided by programming circuit 49. In other embodiments, IC 50 can be of a hardwired, dedicated type, or a combination of dedicated and ASIC-definable features. In still other embodiments, a combination of two or more integrated circuits or other components are used instead of a single IC 50. Alternatively or additionally, one or more components of circuitry 40 external to IC 50 can be incorporated in IC 50.

Any theory, mechanism of operation, proof, or finding stated herein is meant to further enhance understanding of the present invention, and is not intended to limit the present invention in any way to such theory, mechanism of operation, proof, or finding. While the invention has been illustrated and described in detail in the drawings and foregoing description, the same is to be considered as illustrative and not restrictive in character, it being understood that only selected embodiments have been shown and described and that all equivalents, changes, and modifications that come within the spirit of the inventions as defined herein or by the following claims are desired to be protected. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary.

What is claimed is:

1. A method, comprising:
providing circuitry operable to regulate an alternator in accordance with any of three or more different multibit control word values, the circuitry including an analog-to-digital converter;
selecting one of at least three different multibit control word values; and
programming the circuitry with the one of the multibit control word values by providing an analog input to the analog-to-digital converter, the analog-to-digital converter being responsive to at least three different levels of the analog input to correspondingly generate each of the at least three multibit control word values.

2. The method of claim 1, wherein said programming includes generating the analog input with a voltage divider.

3. The method of claim 1, further comprising providing another analog input to the circuitry to select a further multibit value.

4. The method of claim 3, further comprising providing logic to select an operating mode and one or more operating parameters based on the one of the multibit control word values and the further multibit value.

5. The method of claim 1, wherein the analog-to-digital converter includes at least three comparators, and said programming includes comparing the analog input with the comparators.

6. The method of claim 1, wherein said providing includes providing the circuitry in the form of an integrated circuit and said programming includes electrically coupling an analog programming device to the integrated circuit.

7. The method of the claim 1, wherein said programming includes adjusting a resistance value of at least one component.

8. An apparatus, comprising:
an integrated circuit operable to regulate an electrical output of an alternator, said integrated circuit including a first analog-to-digital converter with a first analog signal input, said first analog-to-digital converter being responsive to three or more different analog signal levels provided to said first input to correspondingly generate three or more different values for a multibit control word; and
a first analog programming device electrically coupled to said integrated circuit to provide a first analog signal input to said first input to select one of said three or more different values of said multibit control word.

9. The apparatus of claim 8, wherein said first analog-to-digital converter includes at least three comparators each electrically coupled to said first input.

10. The apparatus of claim 8, wherein said integrated circuit includes a second analog-to-digital converter and a second analog signal input and further comprising a second analog programming device coupled to said second input to select a value for another control word.

11. The apparatus of claim 10, wherein said integrated circuit includes logic responsive to said first analog-to-digital converter and said second analog-to-digital converter to select one or more operating parameters of said integrated circuit as a function of said one of said three or more different values of said multibit control word and said value for another control word.

12. The apparatus of claim 8, further comprising a substrate, said integrated circuit and said first analog programming device being mounted to said substrate.

13. The apparatus of claim 12, wherein said first analog programming device includes at least one thick film resistor.

14. An apparatus, comprising:
an alternator; and
circuitry operable to regulate an electrical output of said alternator, said circuitry including a first analog-to-digital converter with a first analog signal input node, said first analog-to-digital converter being responsive to three or more different analog signal levels provided to said first input node to correspondingly generate three or more different multibit word values, said circuitry being programmable with any of said three or more multibit word values to correspondingly operate in three or more different operating configurations.

15. The apparatus of claim 14, further comprising a voltage divider coupled to said first input node.

16. The apparatus of claim 15, further comprising a substrate, said circuitry including an integrated mounted to said substrate and said voltage divider including at least one thick film resistor mounted to said substrate.

17. The apparatus of claim 14, wherein said circuitry includes a second analog-to-digital converter and a second analog signal input node and further comprising a second analog programming device coupled to said second input node to select a value for another control word.

18. The apparatus of claim 17, wherein said circuitry includes logic means responsive to said first analog-to-digital converter and said second analog-to-digital converter for selecting one or more operating parameters of said circuitry as a function of said one of said three or more different values of said multibit control word and said value for another control word.

19. The apparatus of claim 14, wherein said alternator includes a field coil, and said circuitry includes a transistor operable to modulate electrical current flow through said field coil.

20. An apparatus, comprising:

an integrated circuit operable to regulate an electrical output of an alternator, said integrated circuit being programmable with different values of a multibit control word, said integrated circuit including three or more comparators each defining a different bit of the multibit control word; and an analog programming device electrically coupled to said integrated circuit to input an analog signal to each of said comparators, said analog programming device being operable to select one of the different values of said multibit control word.

21. The apparatus of claim 20, wherein said integrated circuit includes several other comparators operable to provide a further multibit control word according to another analog programming device coupled thereto.

22. The apparatus of claim 21, wherein said integrated circuit includes decoding logic responsive to said three or more comparators and said several other comparators and said integrated circuit further includes selection logic responsive to said decoding logic.

23. The apparatus of claim 20, wherein said integrated circuit and said analog programming device are mounted on a substrate.

24. The apparatus of claim 23, wherein said analog programming device includes a voltage divider defined by at least one thick film resistor.

25. A method, comprising:

providing an integrated circuit including an analog input;

supplying an analog signal to the analog input to select among three or more different values of a multibit control word to program the integrated circuit; and regulating an alternator output with the integrated circuit.

26. The method of claim 25, wherein said supplying including providing the analog signal with one or more thick film resistors and further comprising trimming at least one of the thick film resistors.

27. The method of claim 25, further comprising mounting said integrated circuit on a substrate and wherein said supplying including providing the analog signal with at least one resistor mounted on the substrate.

28. The method of claim 27, further comprising trimming the resistor mounted on the substrate.

29. The method of claim 25, wherein said providing including providing the integrated circuit with a first analog-to-digital converter coupled to said analog input.

30. The method of claim 29, wherein said providing further includes providing the integrated circuit with a second analog-to-digital converter and logic responsive to the first analog-to-digital converter and the second analog-to-digital converter.

* * * * *